US012262345B2

(12) United States Patent  
Barbu et al.

(10) Patent No.: US 12,262,345 B2  
(45) Date of Patent: Mar. 25, 2025

(54) POSITIONING OF LOW POWER USER DEVICES

(71) Applicant: NOKIA TECHNOLOGIES OY, Espoo (FI)

(72) Inventors: Oana-Elena Barbu, Aalborg (DK); Nuno Manuel Kiilerich Pratas, Aalborg (DK); Benny Vejlgaard, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/926,930

(22) Filed: Oct. 25, 2024

(65) Prior Publication Data

US 2025/0048325 A1    Feb. 6, 2025

Related U.S. Application Data

(63) Continuation of application No. 18/685,344, filed as application No. PCT/EP2021/075061 on Sep. 13, 2021.

(51) Int. Cl.  
*H04W 64/00*    (2009.01)  
*H04W 92/18*    (2009.01)

(52) U.S. Cl.  
CPC ............ *H04W 64/00* (2013.01); *H04W 92/18* (2013.01)

(58) Field of Classification Search  
CPC ...... H04W 64/00; H04W 76/14; H04W 92/18  
USPC ............... 455/456.1, 456.2, 456.6, 75, 456.5  
See application file for complete search history.

(56) References Cited

U.S. PATENT DOCUMENTS

| | | | |
|---|---|---|---|
| 8,055,272 B1 | 11/2011 | Wilson | |
| 11,711,782 B2 * | 7/2023 | Bao | H04B 17/24 |
| | | | 455/456.1 |
| 11,736,895 B2 * | 8/2023 | Balasubramanian ... | H04W 4/20 |
| | | | 455/456.2 |

(Continued)

FOREIGN PATENT DOCUMENTS

| | | |
|---|---|---|
| WO | WO 2021/058478 A1 | 4/2021 |
| WO | WO 2021/138127 A1 | 7/2021 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 v16.4.0, (Mar. 2021), pp. 1-119.

(Continued)

*Primary Examiner* — Joseph Arevalo  
(74) *Attorney, Agent, or Firm* — ALSTON & BIRD LLP (57) ABSTRACT

Various example embodiments relate to a solution for positioning of a low power device using sidelink peers. A target user device for a locally assisted positioning procedure may receive a trigger event to initiate positioning of the target user device, the trigger event originating from a location management function in relation to the locally assisted positioning procedure. The target user device may transmit at least one local positioning aid request to one or more anchor user devices for the locally assisted positioning procedure, the at least one local positioning aid request indicating a need for the locally assisted positioning procedure for the positioning of the target user device. Devices, methods, and computer programs are disclosed.

12 Claims, 6 Drawing Sheets

(56) References Cited

U.S. PATENT DOCUMENTS

| | | | |
|---|---|---|---|
| 2010/0141445 A1* | 6/2010 | Venkatasubramaniyam ................ | H04W 4/029 704/8 |
| 2013/0012232 A1* | 1/2013 | Titus ....................... | H04L 67/52 455/456.2 |
| 2013/0281110 A1 | 10/2013 | Zelinka | |
| 2017/0212206 A1 | 7/2017 | Kim et al. | |
| 2019/0230618 A1 | 7/2019 | Saur et al. | |
| 2019/0239181 A1 | 8/2019 | Gangakhedkar et al. | |
| 2020/0389759 A1 | 12/2020 | Wang et al. | |
| 2023/0081093 A1* | 3/2023 | Manolakos ........... | H04W 64/00 455/456.1 |
| 2023/0199522 A1* | 6/2023 | Manolakos ........... | H04W 64/00 455/456.1 |
| 2023/0243913 A1* | 8/2023 | Fischer ................ | G01S 5/0236 455/75 |
| 2023/0319763 A1* | 10/2023 | Yerramalli ............ | G01S 5/0236 455/456.1 |

OTHER PUBLICATIONS

McDermott et al., "Cooperative UTDOA Positioning in LTE Cellular Systems", IEEE Globecom Workshops (GC Wkshps), (Dec. 6-10, 2015), 6 pages.

"3rd Generation Partnership Project; Technical Specification Group Radio Access Network; NR; Physical layer procedures for data (Release 16)", 3GPP TS 38.214 v16.6.0, (Jun. 2021), pp. 1-172.

3rd Generation Partnership Project; Technical Specification Group Radio Access Network; LTE Positioning Protocol (LPP) (Release 16), 3GPP TS 37.355 16.4.0, (Mar. 2021), pp. 1-298.

""3rd Generation Partnership Project; Technical Specification Group Radio Access Network; NR; Radio Resource Control (RCC) protocol specification (Release 16), 3GPP TS 38.331 v16.4.1, (Mar. 2021), pp. 1-949.

""3rd Generation Partnership Project; Technical Specification Group Radio Access Network; NG-RAN; NR Positioning Protocol A (NRPPa) (Release 16), 3GPP TS 38.455 v16.4.0, (Jul. 2021), pp. 1-151.

Lu et al., "Joint Positioning and Tracking via NR Sidelink in 5G-Empowered Industrial IoT: Releasing the Potential of V2X Technology", arXiv, (Jun. 3, 2021), 8 pages.

"IEEE 802.11", Wikipedia, Retrieved on Feb. 21, 2024, Webpage available at: https://en.wikipedia.org/wiki/IEEE_802.11.

International Search Report and Written Opinion for Patent Cooperation Treaty Application No. PCT/EP2021/075061 dated May 4, 2022, 12 pages.

U.S. Appl. No. 18/685,344, filed Feb. 21, 2024, US-2024/0397467 A1, Pending.

* cited by examiner

POSITIONING OF LOW POWER USER DEVICES

CROSS-REFERENCE TO RELATED APPLICATIONS

This application is a continuation of U.S. application Ser. No. 18/685,344, filed Feb. 21, 2024, which is a national phase entry of International Application No. PCT/EP2021/075061, filed Sep. 13, 2021, the entire contents of which are incorporated herein by reference.

TECHNICAL FIELD

Various example embodiments generally relate to the field of wireless data communications. In particular, some example embodiments relate to a solution for positioning of low power user devices.

BACKGROUND

The capability of positioning user devices, for example, mobile devices or mobile phones, is a common feature. When a device has adequate processing power and battery resources, the positioning may be implemented, for example, using satellite positioning.

However, when the device is a smaller device, it is usually also a low power device that may have very limited processing power and battery resources. This means that it may not be possible to implement the necessary hardware and software in the device to enable the satellite positioning.

The positioning may also be network based. In other words, a device may not have satellite positioning capabilities. Instead, the positioning may rely on uplink measurements/signals. A network node, for example, a base station, may measure a relative time of arrival (RTOA) based on a signalling message from a user device. The position of the device may then be estimated based on the RTOA.

However, sometimes it may happen that that a user device is in a poor network coverage or is power limited and cannot sustain a full uplink positioning sessions. Further, it may also be that a user device is not able to compute and/or transfer a measurement report that fulfils the radio network requirements in terms of latency and periodicity.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may provide an aided positioning procedure that allows a power impaired user device, for example, a user equipment, to acquire its position or inform a network node about its position by leveraging on the positioning information already available at nearby user devices. This benefit may be achieved by the features of the independent claims. Further implementation forms are provided in the dependent claims, the description, and the drawings.

According to a first aspect, a target user device for a locally assisted positioning procedure may comprise at least one processor and at least one memory including computer program code, the at least one memory and the computer program code configured to, with the at least one processor, cause the target user device at least to: receive a trigger event to initiate positioning of the target user device, the trigger event originating from a location management function in relation to the locally assisted positioning procedure; and transmit at least one local positioning aid request to one or more anchor user devices for the locally assisted positioning procedure, the at least one local positioning aid request indicating a need for the locally assisted positioning procedure for the positioning of the target user device.

In an example embodiment, the at least one memory and the computer program code are configured to, with the at least one processor, cause the target user device at least to: prior to transmitting the at least one local positioning aid request, transmit an indication to the location management function, the indication being indicative of preference of the target user device in applying the locally assisted positioning procedure for the positioning of the target user device; and receive from the location management function, an acknowledgement to apply the locally assisted positioning procedure for the positioning of the target user device.

In an example embodiment, the at least one memory and the computer program code are configured to, with the at least one processor, cause the target user device at least to: transmit the at least one local positioning aid request to the one or more anchor user devices via broadcasting using at least one resource pool configured for the locally assisted positioning procedure.

In an example embodiment, the at least one memory and the computer program code are configured to, with the at least one processor, cause the target user device at least to: transmit the at least one local positioning aid request to the one or more anchor user devices with which a radio resource control connection is available.

In an example embodiment, the at least one memory and the computer program code are configured to, with the at least one processor, cause the target user device at least to: transmit the at least one local positioning aid request to the location management function via positioning protocol signaling.

In an example embodiment, the at least one memory and the computer program code are configured to, with the at least one processor, cause the target user device at least to receive at least one local positioning aid response from the one or more anchor user devices, the at least one local positioning aid response comprising at least one of the following: a rejection indication to the at least one local positioning aid request, an acknowledgement to the at least one local positioning aid request, location data associated with the one or more anchor user devices, and an indication that the location data associated with the one or more anchor user devices is to be transmitted to the location management function.

In an example embodiment, the at least one memory and the computer program code are configured to, with the at least one processor, cause the target user device at least to calculate the location of the target user device based at least on the location data associated with the one or more anchor user devices, wherein the at least one local positioning aid response comprises at least the location data associated with the one or more anchor user devices.

In an example embodiment, the at least one memory and the computer program code are configured to, with the at least one processor, cause the target user device at least to: measure a received power of the at least one local positioning aid response, and use the measured received power in calculating the location of the target user device.

In an example embodiment, the at least one memory and the computer program code are configured to, with the at least one processor, cause the target user device at least to transmit the calculated location of the target user device to the location management function.

In an example embodiment, the at least one memory and the computer program code are configured to, with the at least one processor, cause the target user device at least to: transmit the location data associated with the one or more anchor user devices to the location management function, wherein the at least one local positioning aid response comprises the location data associated with the one or more anchor user devices.

In an example embodiment, the target user device comprises the location management function.

In an example embodiment, the location management function is a network based function, and the target user device is configured to obtain the trigger event as a signaling message from the network based function.

In an example embodiment, the at least one memory and the computer program code are configured to, with the at least one processor, cause the target user device at least to determine a failure with the locally assisted positioning procedure when failing to receive one or more local positioning aid responses from the one or more anchor user devices in response to the at least one local positioning aid request within an observation time window.

In an example embodiment, the at least one memory and the computer program code are configured to, with the at least one processor, cause the target user device at least to determine a failure with the locally assisted positioning procedure when failing to receive the acknowledgement indicated by the at least one local positioning aid response in response to the at least one local positioning aid request from a predetermined required number of user devices within an observation time window.

In an example embodiment, the at least one memory and the computer program code are configured to, with the at least one processor, cause the target user device at least to in accordance with a determination of the failure with the locally assisted positioning procedure, revert back to a standard positioning procedure which is different from the locally assisted positioning procedure.

In an example embodiment, the at least one memory and the computer program code are configured to, with the at least one processor, cause the target user device at least to in accordance with a determination of the failure with the locally assisted positioning procedure, transition to a low power consumption mode.

According to a second aspect, an anchor user device for a locally assisted positioning procedure may comprise at least one processor and at least one memory including computer program code, the at least one memory and the computer program code configured to, with the at least one processor, cause the target user device at least to: receive a local positioning aid request associated with a target user device for the locally assisted positioning procedure, the local positioning aid request indicating a need for the locally assisted positioning procedure for positioning of the target user device; and transmit to the target user device, a local positioning aid response in response to the local positioning aid request to.

In an example embodiment, the local positioning aid response comprises at least one of the following: a rejection indication to the local positioning request, an acknowledgement to the local positioning aid request, location data associated with the anchor user device, and an indication that the location data associated with the anchor user device is to be transmitted to a location management function.

In an example embodiment, the at least one memory including computer program code, the at least one memory and the computer program code configured to, with the at least one processor, cause the anchor user device at least to obtain the location data associated with the anchor user device, wherein the local positioning aid response comprises the location data associated with the anchor user device.

In an example embodiment, the at least one memory including computer program code, the at least one memory and the computer program code configured to, with the at least one processor, cause the anchor user device at least to: transmit a positioning protocol request to the location management function, and receive, from the location management function, the location data associated with the anchor user device, wherein the local positioning aid response comprises the location data associated with the anchor user device.

In an example embodiment, the at least one memory including computer program code, the at least one memory and the computer program code configured to, with the at least one processor, cause the anchor user device at least to: obtain the location data associated with the anchor user device, and transmit the location data associated with the anchor user device to the location management function.

In an example embodiment, the at least one memory including computer program code, the at least one memory and the computer program code configured to, with the at least one processor, cause the anchor user device at least to transmit positioning protocol signaling to the location management function, the positioning protocol signaling enabling the location management function obtaining the location data associated with the anchor user device based on radio signal measurement data.

According to a third aspect, a location management function for positioning of a target user device for a locally assisted positioning procedure may comprise at least one processor and at least one memory including computer program code, the at least one memory and the computer program code configured to, with the at least one processor, cause the location management function at least to: receive an indication from the target user device, the indication indicating preference of the target user device in applying the locally assisted positioning procedure with one or more anchor user devices; and transmit to the target user device, an acknowledgement to apply the locally assisted positioning procedure for the target user device.

In an example embodiment, the at least one memory and the computer program code are configured to, with the at least one processor, cause the location management function at least to: receive from the one or more anchor user devices, location data associated with the one or more anchor user devices.

In an example embodiment, the at least one memory and the computer program code are configured to, with the at least one processor, cause the location management function at least to: receive at least one positioning protocol request from the one or more anchor user devices; and obtain location data associated with the one or more anchor user devices based on radio signal measurement data associated with the one or more anchor user devices.

In an example embodiment, the at least one memory and the computer program code are configured to, with the at least one processor, cause the location management function at least to calculate a location of the target user device based at least on the location data associated with the one or more anchor user devices.

According to a fourth aspect, there is provided a method for a locally assisted positioning procedure, the method comprising: receiving, by a target user device for the locally assisted positioning procedure, a trigger event to initiate positioning of the target user device, the trigger event originating from a location management function in relation to the locally assisted positioning procedure; and transmitting, by the target user device, at least one local positioning aid request to one or more user devices for the locally assisted positioning procedure, the at least one local positioning aid request indicating a need for the locally assisted positioning procedure for the positioning of the target user device.

According to a fifth aspect, there is provided a method for a locally assisted positioning procedure, the method comprising: receiving, by an anchor user device for the locally assisted positioning procedure, a local positioning aid request associated with a target user device for the locally assisted positioning procedure, the local positioning aid request indicating a need for the locally assisted positioning procedure for positioning of the target user device; and transmitting, by the anchor user device, a local positioning aid response in response to the local positioning aid request, to the target user device.

According to a sixth aspect, there is provided a method for a locally assisted positioning procedure, the method comprising: receiving, by a location management function in relation to positioning of a target user device for the locally assisted positioning procedure, an indication from the target user device, the indication indicating preference of the target user device in applying the locally assisted positioning procedure with one or more anchor user devices for the positioning of the target user device; and transmitting, by the location management function, an acknowledgement to the target user device to apply the locally assisted positioning procedure.

According to a seventh aspect, there is provided a computer program comprising instructions for causing an apparatus to perform at least the following: receiving a trigger event to initiate positioning of a target user device for a locally assisted positioning procedure, the trigger event originating from a location management function in relation to the locally assisted positioning procedure; and transmitting at least one local positioning aid request to one or more anchor user devices for the locally assisted positioning procedure, the at least one local positioning aid request indicating a need for the locally assisted positioning procedure for the positioning of the target user device.

According to an eighth aspect, there is provided a computer program comprising instructions for causing an apparatus to perform at least the following: receiving a local positioning aid request associated with a target user device for a locally assisted positioning procedure, the local positioning aid request indicating a need for the locally assisted positioning procedure for positioning of the target user device; and transmitting a local positioning aid response in response to the local positioning aid request to the target user device.

According to a ninth aspect, there is provided a computer program comprising instructions for causing an apparatus to perform at least the following: receiving an indication from a target user device for a locally assisted positioning procedure, the indication indicating preference of the target user device in applying the locally assisted positioning procedure with one or more anchor user devices for positioning of the target user device; and transmitting an acknowledgement to the target user device to apply the locally assisted positioning procedure.

According to a tenth aspect, a target user device for a locally assisted positioning procedure may comprise means for: receiving a trigger event to initiate positioning of the target user device, the trigger event originating from a location management function in relation to the locally assisted positioning procedure; and transmitting at least one local positioning aid request to one or more anchor user devices for the locally assisted positioning procedure, the at least one local positioning aid request indicating a need for the locally assisted positioning procedure for the positioning of the target user device.

According to an eleventh aspect, an anchor user device for a locally assisted positioning procedure may comprise means for: receiving a local positioning aid request associated with a target user device for the locally assisted positioning procedure, the local positioning aid request indicating a need for the locally assisted positioning procedure for positioning of the target user device; and transmitting a local positioning aid response in response to the local positioning aid request, to the target user device.

According to a twelfth, a location management function for a locally assisted positioning procedure may comprise means for: receiving, by the location management function in relation to positioning of a target user device for the locally assisted positioning procedure, an indication from the target user device, the indication indicating preference of the target user device in applying the locally assisted positioning procedure with one or more anchor user devices for the positioning of the target user device; and transmitting an acknowledgement to the target user device to apply the locally assisted positioning procedure.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments.

In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms, in which the present example may be constructed or utilized. The description sets forth the functions of the example and the sequence of steps for constructing and operating the example. However, the same or equivalent functions and sequences may be accomplished by different examples.

Some example embodiments of the present disclosure have been described in a specific data communication environment, for example, mobile communication network environment. The present disclosure can, however, be applied in any existing or coming environment that comprises power limited devices for which location needs to be determined.

Figure 1:
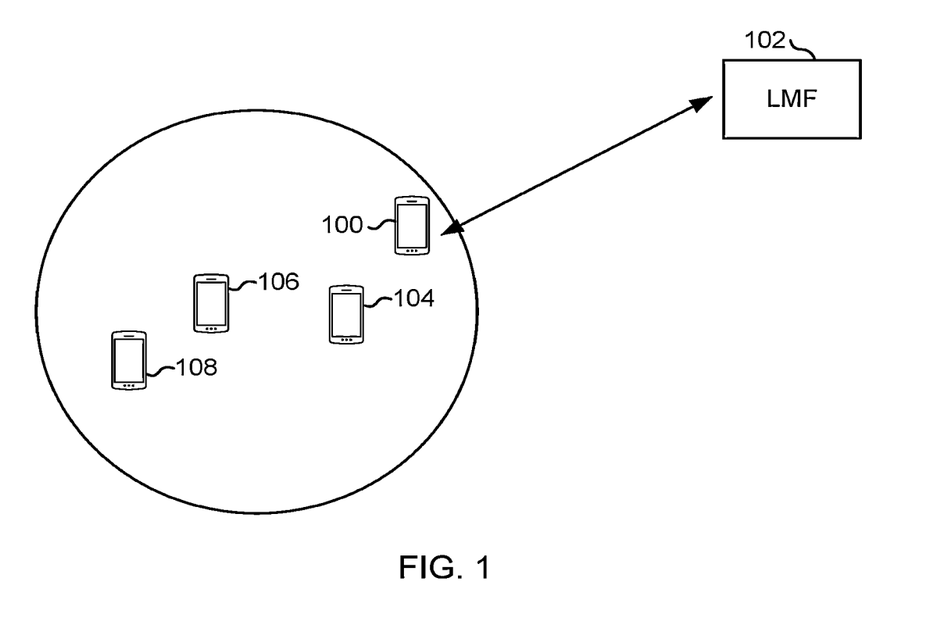
FIG. 1 illustrates a low power user device in a network environment.

FIG. 1 illustrates a low power user device 104 which is not able to implement a New Radio (NR) positioning session. The positioning of power limited user devices may have at least one of the following challenges:

1. The uplink (UL) link budget. The reception of positioning signals by a target base station, (for example, gNB) may be limited due to the challenging propagation conditions combined with a device's (for example, a tag) limited transmit power capabilities. Hence, the situation in which the device is not heard may be frequent.
2. It is preferred that such devices operate as much as possible in an idle/inactive state in order to preserve power levels over long periods of time. This means that communication and localization by interactions with the radio communication network may need to be first and foremost optimized for power consumption.
3. Both the UL and downlink (DL) positioning procedures are very energy intensive. For example, in a case of UL based positioning where as part of the procedure, a user device may be configured to transmit a sounding reference signals (SRS) for positioning (which are wideband signals) with full transmission power over multiple directions and multiple times. Similarly, in the case of DL based positioning, the user device spends high amounts of resources for both configuration of the session and measurements of hundreds of DL signals.

In FIG. 1, the location of a user device 100 may be obtained by a New Radio (NR) positioning procedure using a location management function (LMF) 102. The location of a user device 106 may be obtained, for example, via a camera sensor etc. The location of a user device 108 may be obtained, for example, via its global navigation satellite system (GNSS) receiver. A user device 104 may be a low power user device that has limited or non-existent positioning capabilities. There is therefore a need to introduce low power positioning procedures that are compatible with the capabilities of power impaired user devices. In the following, various examples and embodiments are discussed relating to a solution which leverages sidelink communications to take advantage of nearby devices to aid on the power impaired user device positioning.

Figure 2A:
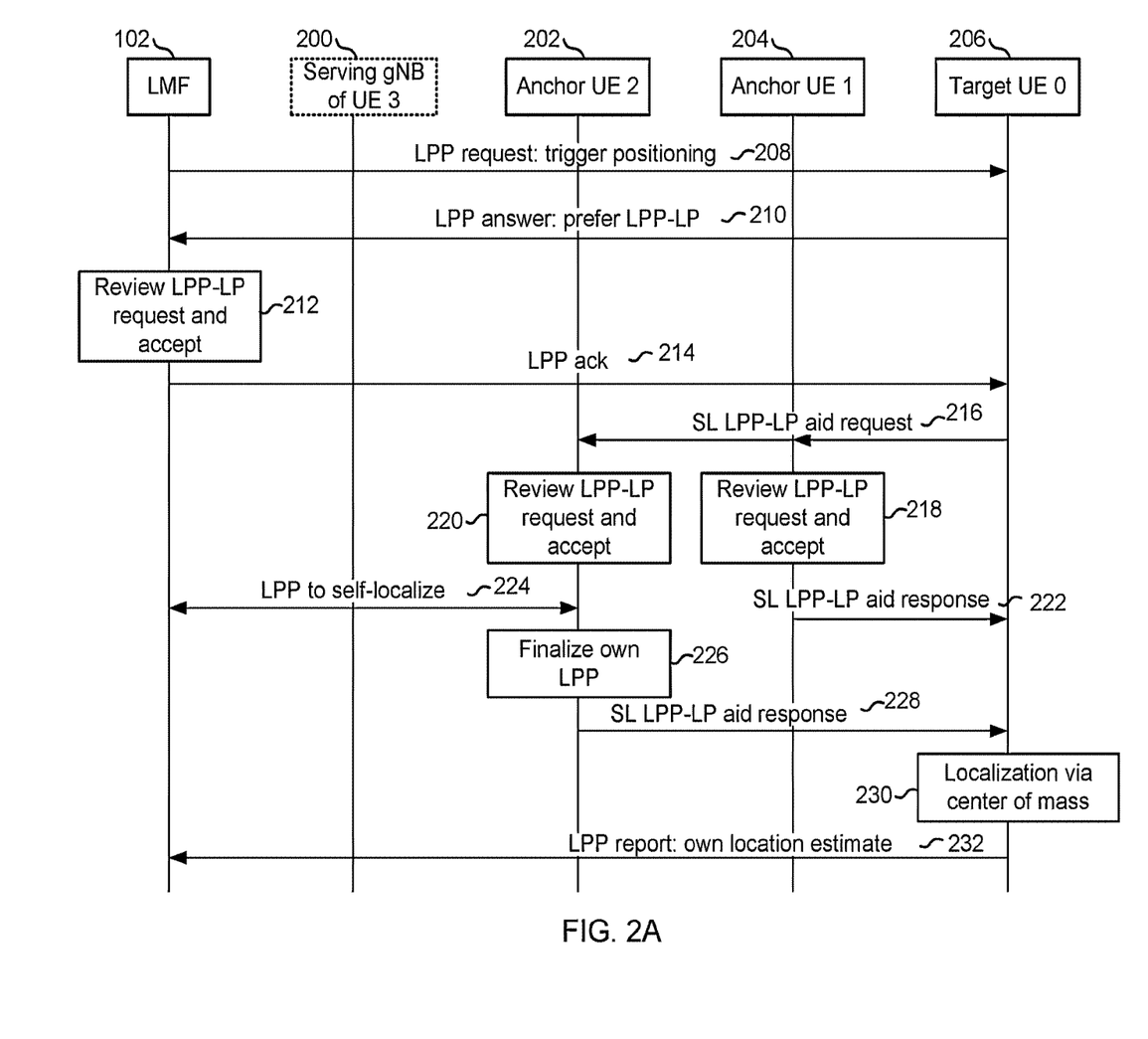
FIG. 2A illustrates a target user device positioning solution according to an example embodiment.

FIG. 2A illustrates a target user device for a locally assisted positioning procedure according to an example embodiment.

The system illustrated in FIG. 2A comprises three user devices 202, 204, 206 and a location management function (LMF) 102. The user device 206 is herein called as "a target user device", and it may be a power impaired user device. The user devices 202, 204 are herein called as "anchor user devices", and the anchor user device is a user device whose position information is used to determine a position for the target user device 206. An anchor user device may be a user device that has satellite positioning capabilities. The anchor user device may also be a user device whose position may be determined by a wireless communication network, for example, a radio new (NR) network. The location management function 102 may refer to an entity that receives measurements and assistance information from a next generation radio access network (NG-RAN) and a mobile device, for example, user equipment (UE).

At 208 the LMF 102 may be configured to send a request to trigger positioning of the target user device 206. The request may be, for example, an LTE positioning protocol (LPP) request. If the target user device 206 is in a radio resource control (RRC) idle/inactive state, a paging message may be triggered which in turn will make the target user device 206 to initiate a positioning procedure, i.e. a locally assisted positioning procedure, discussed in more detail shortly. The locally assisted positioning procedure is herein called as "LPP-LP".

In an example embodiment, the paging message may either indicate directly that the target user device 206 should initiate the LPP-LP procedure. Alternatively, the target user device 206 may proceed to transition to an RRC connected state, and where after completing the transition, it receives the LPP messaging at 206.

If the target user device 206 is in an RRC connected state, by triggering the transmission of a downlink message (whose payload may include the LPP request indicated at 208), the target user device 206 is indicated to initiate the LPP-LP procedure.

At 210 the target user device 206 may be configured to send, in response to the LPP request at 208, an indication indicative of preference of the target user device 206 in applying a locally assisted positioning procedure for the positioning of the target user device 206. The indication may be transmitted in an LPP answer signaling. In an example embodiment, the LMF 102 may not be aware that the target user device 206 is power impaired (or that the power impairment is not permanent, for example, for energy harvesting devices), and thus the target user device 206 may indicate to the LMF 102 that it will not perform a normal or a standard positioning procedure which is different from the locally assisted positioning procedure, and instead will perform the LPP-LP procedure. This indication may be implicit (for example, by default, if the target user device 206 is in the RRC idle and/or inactive state, it will proceed with the LPP-LP procedure), or the target user device 206 may indicate this to the LMF 102 explicitly. If the target user device 206 is in the RRC idle/inactive state, in the explicit indication case, it may be required to transition to the RRC connected state prior to the transmission of the indication. Alternatively, the target user device 206 may instead share the indication via a small data transmission.

At 212 the LMF 102 may be configured to review the LPP-LP request and accept it.

At 214 the LMF 102 may be configured to send an acknowledgement to the target user device 206 to apply the locally assisted positioning procedure, i.e. the LPP-LP.

At 216 the target user device 206 may be configured to send a local positioning aid request (for example, a side-link LPP-LP aid request) indicating a need for a locally assisted positioning procedure to one or more anchor user devices for the locally assisted positioning procedure. The request asks nearby user devices to join the assisted positioning procedure and thus to become anchor user devices for the target user device 206. FIG. 2A illustrates an example in which two user devices act as anchor user devices. In another example, there may be only one anchor user device or any number of anchor user devices. The request may go to the anchor user devices 202, 204 directly via a sidelink (SL) shared channel. In another example embodiment, the request may go to the LMF 102 via LPP, and the LMF 102 then may be configured to reroutes the request to the respective serving gNB 200 via the new radio positioning protocol A (NRPPa).

In an example embodiment, there may be a mix of user devices within the group of nearby user devices, where some of them can be power impaired while others may be non-power impaired user devices (for example, nearby smartphones, SL enabled vehicles or SL enabled infrastructures such as road side units). It is assumed that the network is aware of the capabilities of the various user devices to use SL. For example, at some point each user device may have indicated this information to the network, for example, as part of the user device's RRC capabilities exchange signaling. The SL LPP-LP aid request may be implemented, for example, as a SL transmission to a resource pool where the LPP-LP is configured to occur. The configuration of which resource pools can be used for the LPP-LP may be part of network configuration or part of an SL pre-configuration.

In an example embodiment, the SL transmission denoted as "SL LPP-LP aid request" may be part of the $2^{nd}$ stage sidelink control information (SCI) or a medium control access control (MAC) element (CE). The information present in this request may include at least one of the following:
  i. The L1 (or L2) ID of the target user device;
  ii. A delay budget for the LPP-LP aid, for example, in number of system frame numbers (SFN) or time units where the LPP-LP aid request is valid. This information is useful as an anchor user device is not necessarily able to respond right away to the LPP-LP aid request, for example, due the need to acquire first its own position or due to the resource allocation delay.
  iii. Resources where a response (i.e. an LPP-LP aid response) from the anchor user devices is expected to be received. The target user device being power impaired may also be expected to apply discontinuous reception (DRX) and therefore there is the need for it to inform its peers when it will be actively listening to any eventual LPP-LP related feedback.

In an example embodiment, the target user device 206 may be configured to broadcast the SL LPP-LP aid request at 216 in the SL resource pool where the LPP-LP is enabled. In another example embodiment, the target user device 206 and the anchor user device 202 or the anchor user device 204 may already have an ongoing PC5 RRC connection and in that case this message may be unicast.

The resources used for the LPP-LP aid request and LPP-LP aid response may correspond to a SL resource pool where the LPP-LP is configured to occur. There may be a possibility that multiple messages (from multiple user devices) may collide. However, as the access to these resources follows the SL sensing procedure (when assuming Mode 2 resource selection), these collisions could be avoided in that way.

At 218 and 220, the anchor user devices 204, 202 are configured to review the SL LPP-LP aid request and accept it when possible. In an example embodiment, the anchor user devices 202, 204 may transmit to the target user device 206 a local positioning aid response in response to the local positioning aid request. The local positioning aid response may indicate that the anchor user device 202, 204 has accepted the local positioning aid request. LPP-LP enabled anchor user devices may be configured to monitor the resource pool(s) configured for the LPP-LP aid. The monitoring configuration may also include a time period (for example, a DRX ON period) where such request can be expected to be transmitted. This allows the LPP-LP enabled UEs to minimize the amount of time that they spend actively listening to any eventual LPP-LP aid requests.

At 222 the anchor user device 204 may be configured to transmit to the target user device 206 a local positioning aid response, for example, in the form of a SL LPP-LP aid response. The local positioning aid response 222 may comprise at least one of a rejection indication to the local positioning aid request, an acknowledgement to the local positioning aid request, location data associated with the anchor user device 204, and an indication that the location data associated with the anchor user device 204 is to be transmitted to the location management function. FIG. 2A illustrates an embodiment, in which the local positioning aid response 222 includes the location of the anchor user device 204. The step 222 assumes that the anchor user device 204 knows its location or is able to determine it, for example, using the GNSS.

At 224 the anchor user device 202 may be configured to trigger a LPP positioning procedure request to obtain its NR-based location. This step can be followed when the anchor user device 202 is not otherwise able to determine its location, for example, using the GNSS.

At 226 the anchor user device 204 may obtain its NR-based location, and at 228 the anchor user device 202 may be configured send a local positioning aid response to the target user device 206, for example, in the form of a SL LPP-LP aid response. The response may include the location of the anchor user device 202.

At 230 the target user device 206 may be configured to collect the location data received from the anchor user devices 202, 204 and calculate its own location based at least on the location data of the anchor user devices 202, 204. In addition to this, the target user device 206 may also be configured to measure the received power of the local positioning aid responses from the anchor user device 202, 204 and use the measure data in calculating its own location. In an example embodiment, the location may be calculated as a center of mass of the locations of the anchor user devices 202, 204. In an example embodiment, alternatively the target user device 206 may be configured to initiate the signaling exchange with the anchor user devices 202, 204, for example, any SL RS, either bidirectionally or unidirectionally (from the anchor user device 202, 204 to the target user device 206). The target user device 206 then collects positioning measurements, such as time difference of arrival (TDOA), and calculates its own location using these measurements and the anchor user devices' 202, 204 locations.

At 232 the target user device 206 may be configured to send its location to the LMF 102.

In an example embodiment, the target user device 206 may not receive one or more local positioning aid responses (for example, the messages in steps 222 and 228) from the anchor user devices 202, 204 in response to the at least one local positioning aid request within an observation time window. In response to this, the target user device 206 may be configured to determine a failure with the locally assisted positioning procedure. In an example embodiment, the target user device 206 may be configured to determine a failure with the locally assisted positioning procedure when failing to receive one or more positioning aid responses from the one or more anchor devices in response to the at least one local positioning aid request within an observation time window. In another example embodiment, the target user device 206 may be configured to determine a failure with the locally assisted positioning procedure when failing to receive a positive acknowledgement indicated by the local positioning aid response in response to the at least one local positioning aid request from a predetermined required number of devices within an observation time window. In response to determining the failure with the locally assisted positioning procedure, the target user device 206 may be configured to revert back to a standard positioning procedure. The term "standard positioning procedure" may refer to any positioning procedure that is either a target user device based or a network based and is different from the locally assisted positioning procedure, for example, a downlink and/or an uplink based positioning procedure. This may happen, for example, when at least one of a level of available energy of the target user device and a priority of the location positioning aid request calls for it. In another example embodiment, in response to determining the failure with the locally assisted positioning procedure, the target user device 206 may be configured to transition to a low power consumption mode. This may happen, for example, when at least one of a level of available energy of the target user device and a priority of the location positioning aid request does not necessitate to continue with a standard positioning procedure.

Figure 2B:
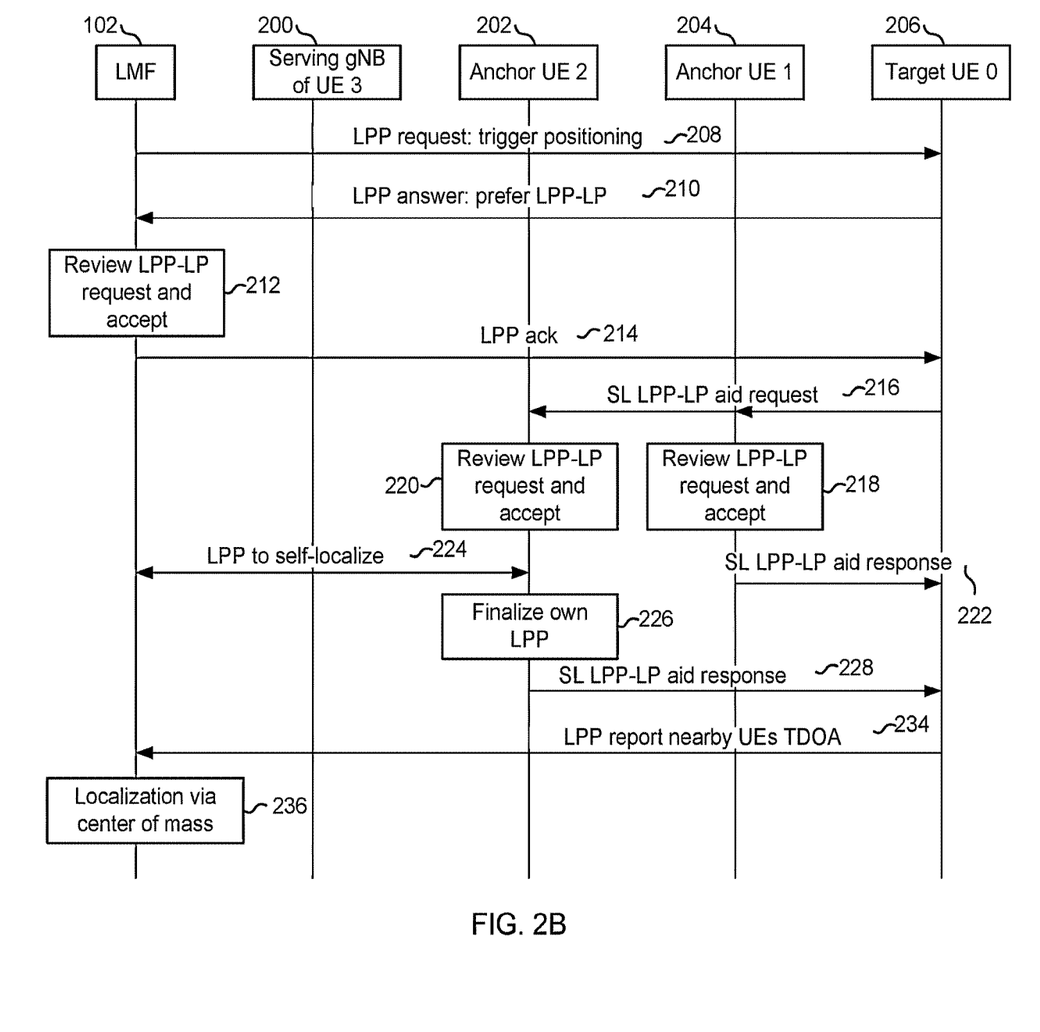
FIG. 2B illustrates a target user device positioning solution according to another example embodiment.

FIG. 2B illustrates a target user device positioning solution according to another example embodiment. The example illustrated in FIG. 2B is similar to the one illustrated in FIG. 2A. The steps 208-228 are identical in FIGS. 2A and 2B, and with respect to them reference is made to the description of FIG. 2A.

The difference in the example illustrated in FIG. 2B is that there the target user device 206 does not itself calculate its location. Instead, at 234 the target user device 206 may be configured to collect the location data received from the anchor user devices 202, 204, and at 234 send the collected location data to the LMF 102.

At 236 the LMF is then configured to calculate the location of target user device 206 based on the received location data.

Figure 2C:
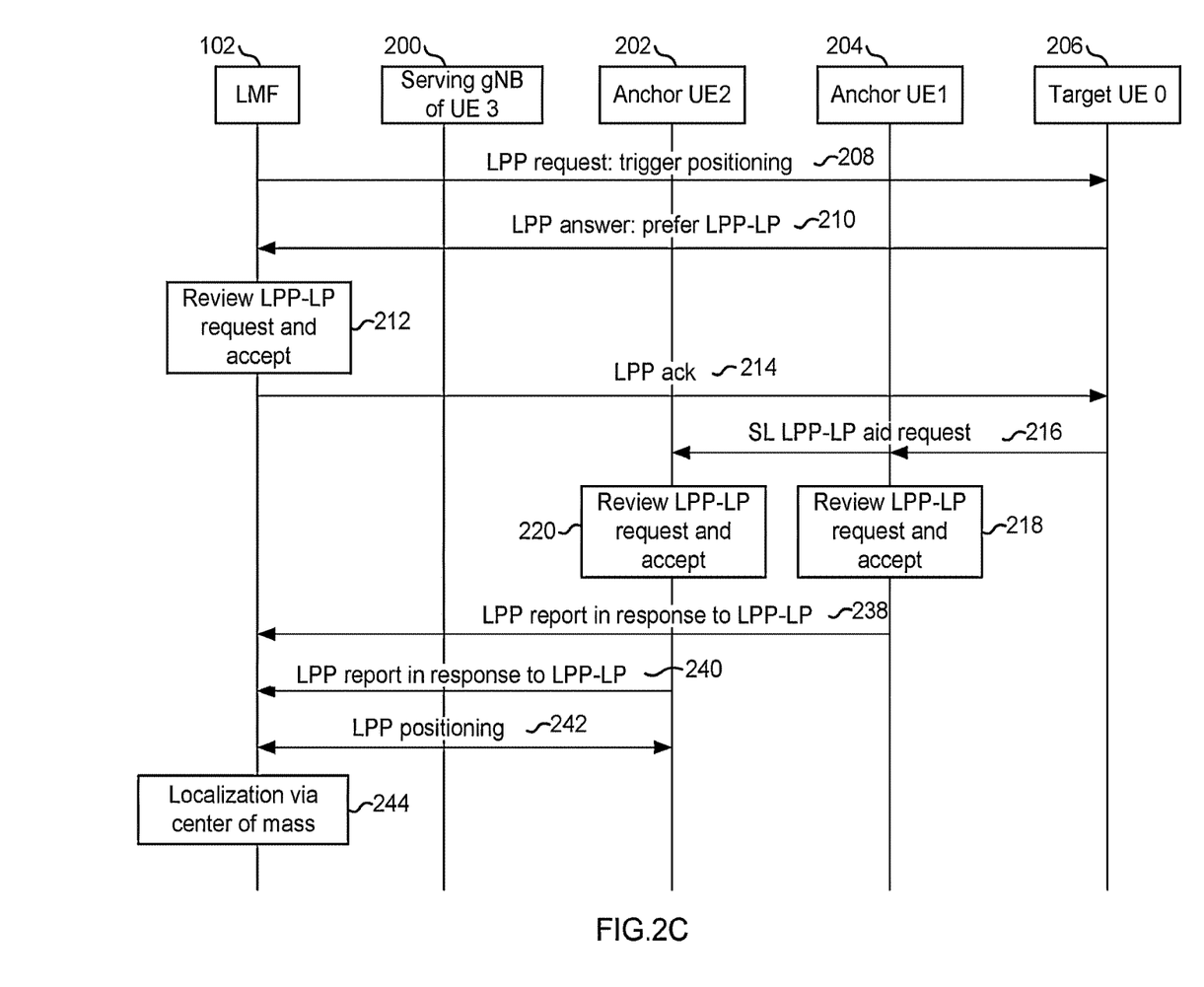
FIG. 2C illustrates a target user device positioning solution according to another example embodiment.

FIG. 2C illustrates a target user device positioning solution according to another example embodiment. The example illustrated in FIG. 2C is similar to the one illustrated in FIG. 2A. The steps 208-218 are identical in FIGS. 2A and 2C, and with respect to them reference is made to the description of FIG. 2A.

The difference in the example illustrated in FIG. 2C is that the target user device 206 transmits the SL LPP-LP aid requests to the anchor user devices 202, 204, but does not receive location data back from the anchor user devices 202, 204.

Instead, at 238 the anchor user device 204 is configured to obtain its location data and send it to the LMF 102.

In the example illustrated in FIG. 2C, the anchor user device 202 does not know its location. Due to this, at 240 the anchor user device 202 is configured to trigger LPP positioning with a message to the LMF 102, for example, LPP report in response to LPP-LP, to enable the LMF to obtain its location, for example, by an NR-based procedure. The purpose of this message is to indicate to the LMF 102 that the anchor user device 202 is a nearby device for the target user device 206.

In response to the message, the LMF 102 may be configured to determine the location of the anchor user device 202 based on a positioning session, for example, an NR-based procedure.

At 244 the LMF may be configured to calculate the location of the target user device 206 based on the location data of the anchor user devices 202, 204. In an example embodiment, the location may be calculated as a center of mass of the locations of the anchor user devices 202, 204.

FIGS. 2A-2C illustrate an example in which the LMF 102 is located at the network. In another example embodiment, the target user device 206 may comprise the LMF, and in step 232 the signaling may be directed to the LMF in the target user device 206. Similarly, in another example embodiment, in FIG. 2B in step 234 the signaling may be directed to the LMF in the target user device 206, and the LMF located in the target user device 206 is configured to calculate the location of target user device 206 based on the received location data.

Figure 3:
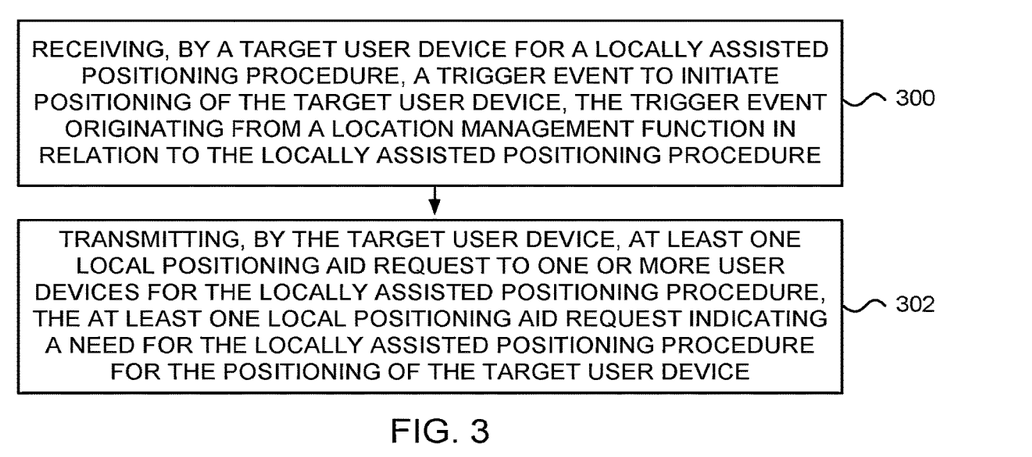
FIG. 3 illustrates an example of a method for a locally assisted positioning procedure according to an example embodiment.

FIG. 3 illustrates an example of a method for a locally assisted positioning procedure according to an example embodiment. The method may be performed by a target user device for the locally assisted positioning procedure, for example, a power limited user equipment or other user device.

At 300 a trigger event to initiate positioning of a target user device is received, the trigger event originating from a location management function in relation to the locally assisted positioning procedure.

At 302 at least one local positioning aid request is transmitted to one or more anchor user devices for the locally assisted positioning procedure, the at least one local positioning aid request indicating a need for the locally assisted positioning procedure for the positioning of the target user device.

Figure 4:
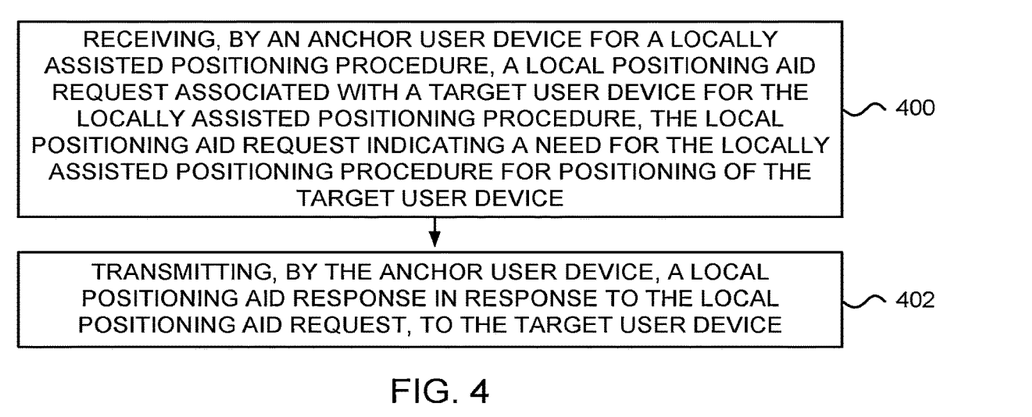
FIG. 4 illustrates an example of a method for a locally assisted positioning procedure according to an example embodiment.

FIG. 4 illustrates an example of a method for a locally assisted positioning procedure according to an example embodiment. The method may be performed by an anchor user device for the locally assisted positioning procedure, for example, a user equipment or some other user device provided positioning aid to a power limited target user device.

At 400 a local positioning aid request associated with a target user device user device for the locally assisted positioning procedure is received, the local positioning aid request indicating a need for the locally assisted positioning procedure for positioning of the target user device.

At 402 a local positioning aid response in response to the local positioning aid request, is transmitted to the target user device.

Figure 5:
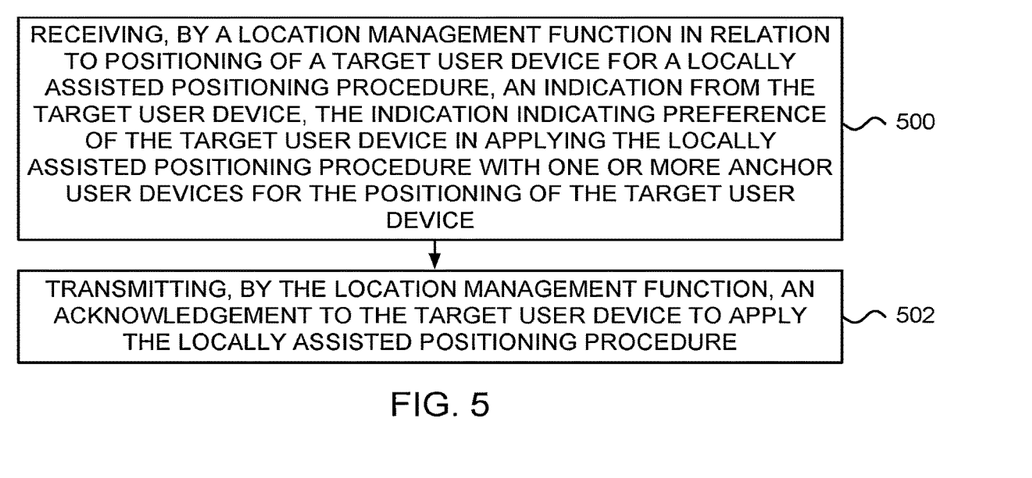
FIG. 5 illustrates an example of a method for a locally assisted positioning procedure according to an example embodiment.

FIG. 5 illustrates an example of a method for a locally assisted positioning procedure according to an example embodiment. The method may be performed by a location management function or a location management function.

At 502 an indication, from a target user device, is received by the location management function in relation to positioning of a target user device for the locally assisted positioning procedure, the indication indicating preference of the target user device in applying the locally assisted positioning procedure with one or more anchor user devices for the positioning of the target user device.

At 504 an acknowledgement is transmitted to the target user device to apply the locally assisted positioning procedure.

One or more of the above discussed examples and embodiments may have various benefits. The illustrated solution may enable positioning of the target user device even if the target user device is out of coverage. The illustrated solution may enable a target user device that is in an RRC idle/inactive state but may still be localized via anchor user devices without waking up. The illustrated solution may enable a target user device that is idle/inactive without a capability to listen for positioning-related paging signals. For example, the listening capability in idle mode may be purposely disabled when insufficient battery level is detected. The illustrated solution may enable a target user device that has low battery power and cannot accept and finalize a standard LPP positioning. The illustrated solution may enable the target user device to have the option of rejecting the session and requesting a low-power alternative.

Figure 6:
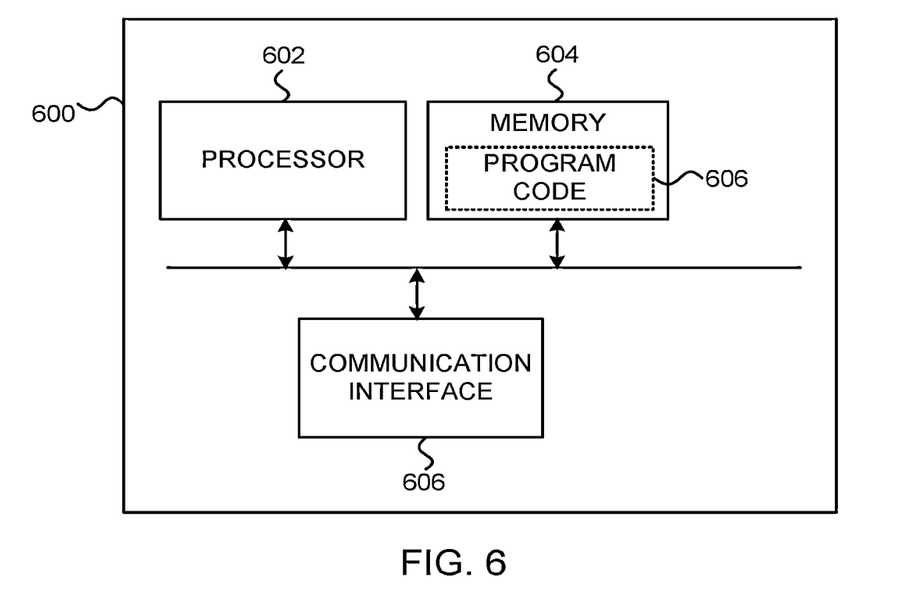
FIG. 6 illustrates an example of an apparatus configured to practice one or more example embodiments.

FIG. 6 illustrates an example of an apparatus 600 configured to practice one or more example embodiments. The apparatus 600 may comprise at least one processor 602. The at least one processor 602 may comprise, for example, one or more of various processing devices or processor circuitry, such as, for example, a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 600 may further comprise at least one memory 604. The at least one memory 604 may be configured to store, for example, computer program code or the like, for example, operating system software and application software. The at least one memory 604 may comprise one or more volatile memory devices, one or more non-volatile memory devices, combination thereof. For example, the at least one memory 604 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 600 may further comprise a communication interface 608 configured to enable apparatus 600 to transmit and/or receive information to/from other devices. In one example, the apparatus 600 may use the communication interface 608 to transmit or receive signaling information and data in accordance with at least one data communication or cellular communication protocol. The communication interface 608 may be configured to provide at least one wireless radio connection, such as, for example, a 3GPP mobile broadband connection (e.g. 3G, 4G, 5G, 6G etc.). In another example embodiment, the communication interface 608 may be configured to provide one or more e other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection, for example, a local area network (LAN) connection, a universal serial bus (USB) connection or an optical network connection, or the like; or a wired Internet connection. The communication interface 608 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

When the apparatus 600 is configured to implement some functionality, some component and/or components of the apparatus 600, for example, the at least one processor 602 and/or the at least one memory 604, may be configured to implement this functionality. Furthermore, when the at least one processor 602 is configured to implement some functionality, this functionality may be implemented using the program code 606 comprised, for example, in the at least one memory 604.

The functionality described herein may be performed, at least in part, by one or more computer program product components such as software components. According to an embodiment, the apparatus may comprise a processor or processor circuitry, for example, a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAS), application-specific Integrated Circuits (ASICs), application-specific Standard Products (ASSPs), System-on-a-chip systems (SOCs), Complex Programmable Logic Devices (CPLDs), and Graphics Processing Units (GPUS).

The apparatus 600 may comprise means for performing at least one method described herein. In an example embodiment, the means may comprise the at least one processor 602, the at least one memory 604 including program code 606 configured to, when executed by the at least one processor, cause the apparatus 600 to perform the method.

The apparatus 600 may comprise, for example, a computing device, for example, a base station, a server, a mobile device, a mobile phone, a user device, a network node, a user equipment, a user node, a tablet computer, a laptop, an internet of things (IoT) device, a tag, or the like. Examples of IoT devices include, but are not limited to, consumer electronics, wearables, sensors, and smart home appliances. Although the apparatus 600 is illustrated as a single device it is appreciated that, wherever applicable, functions of the apparatus 600 may be distributed to a plurality of devices, for example, to implement example embodiments as a cloud computing service.

An apparatus, for example, a device such as a user equipment, a user device, a user node, a mobile device, an IoT node, a network node or a cloud node may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware or circuit(s) and processor(s), as such a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A target user device for a locally assisted positioning procedure (LPP-LP), comprising:
   at least one processor; and
   at least one memory including computer program code, the at least one memory and the computer program code configured to, with the at least one processor, cause the target user device at least to:
   receive a trigger to initiate positioning of the target user device, the trigger originating from a location management function in relation to the locally assisted positioning procedure; and
   transmit at least one local positioning aid request via a sidelink (SL) to one or more anchor user devices for the locally assisted positioning procedure (LPP-LP), the at least one local positioning aid request indicating a need for the locally assisted positioning procedure for the positioning of the target user device.

2. The target user device according to claim 1, wherein the at least one memory including computer program code, the at least one memory and the computer program code configured to, with the at least one processor, cause the target user device at least to:
   receive at least one local positioning aid response from the one or more anchor user devices, the at least one local positioning aid response comprising at least one of the following:
   a rejection indication to the at least one local positioning aid request;
   an acknowledgement to the at least one local positioning aid request;
   location data associated with the one or more anchor user devices; and
   an indication that the location data associated with the one or more anchor user devices is to be transmitted to the location management function.

3. The target user device according to claim 2, wherein the at least one memory including computer program code, the at least one memory and the computer program code configured to, with the at least one processor, cause the target user device at least to:
   calculate location of the target user device based at least on the location data associated with the one or more anchor user devices, wherein the at least one local positioning aid response comprises at least the location data associated with the one or more anchor user devices; and
   transmit the calculated location of the target user device to the location management function.

4. The target user device according to claim 1, wherein the at least one local positioning aid request is transmitted to the one or more anchor user devices with which a radio resource control connection is available.

5. A method for a locally assisted positioning procedure (LPP-LP), comprising:
   receiving, by a target user device for the locally assisted positioning procedure, a trigger to initiate positioning of the target user device, the trigger originating from a location management function in relation to the locally assisted positioning procedure (LPP-LP); and
   transmitting, by the target user device, at least one local positioning aid request via a sidelink (SL) to one or more user devices for the locally assisted positioning procedure, the at least one local positioning aid request indicating a need for the locally assisted positioning procedure for the positioning of the target user device.

6. The method according to claim 5, comprising:
   receiving at least one local positioning aid response from the one or more anchor user devices, the at least one local positioning aid response comprising at least one of the following:

a rejection indication to the at least one local positioning aid request;

an acknowledgement to the at least one local positioning aid request;

location data associated with the one or more anchor user devices; and an indication that the location data associated with the one or more anchor user devices is to be transmitted to the location management function.

7. The method according to claim 6, comprising:

calculating location of the target user device based at least on the location data associated with the one or more anchor user devices, wherein the at least one local positioning aid response comprises at least the location data associated with the one or more anchor user devices; and transmitting the calculated location of the target user device to the location management function.

8. The method according to claim 5, wherein the at least one local positioning aid request is transmitted to the one or more anchor user devices with which a radio resource control connection is available.

9. A volatile memory device comprising instructions for causing an apparatus to perform at least the following:

receiving a trigger to initiate positioning of a target user device for a locally assisted positioning procedure (LPP-LP), the trigger originating from a location management function in relation to the locally assisted positioning procedure; and transmitting at least one local positioning aid request via a sidelink (SL) to one or more anchor user devices for the locally assisted positioning procedure (LPP-LP), the at least one local positioning aid request indicating a need for the locally assisted positioning procedure for the positioning of the target user device.

10. The volatile memory device according to claim 9, comprising:

receiving at least one local positioning aid response from the one or more anchor user devices, the at least one local positioning aid response comprising at least one of the following:

a rejection indication to the at least one local positioning aid request;

an acknowledgement to the at least one local positioning aid request;

location data associated with the one or more anchor user devices; and an indication that the location data associated with the one or more anchor user devices is to be transmitted to the location management function.

11. The volatile memory device according to claim 10, comprising:

calculating location of the target user device based at least on the location data associated with the one or more anchor user devices, wherein the at least one local positioning aid response comprises at least the location data associated with the one or more anchor user devices; and transmitting the calculated location of the target user device to the location management function.

12. The volatile memory device according to claim 9, wherein the at least one local positioning aid request is transmitted to the one or more anchor user devices with which a radio resource control connection is available.

\* \* \* \* \*